(12) United States Patent
Faulstich et al.

(10) Patent No.: US 6,422,924 B1
(45) Date of Patent: Jul. 23, 2002

(54) PROCESS FOR WIDENING THE CROWN OF CYLINDRICAL-TYPE GEARS BY CONTINUOUS DIAGONAL HOBBING

(75) Inventors: Ingo Faulstich; Wilfried Heidelmann, both of Ludwigsburg (DE)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 09/524,713

(22) Filed: Mar. 14, 2000

(30) Foreign Application Priority Data

Mar. 15, 1999 (DE) .......................... 199 11 235

(51) Int. Cl.[7] .................................. B24B 1/00
(52) U.S. Cl. ...................... 451/47; 451/47; 451/147; 451/148; 451/900
(58) Field of Search .................. 451/47, 147, 148, 451/219, 253, 900

(56) References Cited

U.S. PATENT DOCUMENTS 2,729,033 A * 1/1956 Prucknicki et al. ......... 451/148
3,875,635 A * 4/1975 Pavlov et al. .................. 451/47
3,897,661 A * 8/1975 Inatomi et al. ................ 451/47
3,986,305 A * 10/1976 Gunter ......................... 451/47
4,184,796 A * 1/1980 Sakai et al. ................... 409/12
4,475,319 A * 10/1984 Wirz ............................ 451/47
4,744,179 A * 5/1988 Mockli ......................... 409/12
4,831,788 A * 5/1989 Fischer ........................ 451/47
4,850,155 A    7/1989 Sulzer
4,920,703 A * 5/1990 Hosoya ........................ 451/47
5,325,634 A * 7/1994 Kobayashi et al. ........... 451/47
5,456,558 A * 10/1995 Horiuchi ...................... 451/47
5,573,449 A * 11/1996 Mackowsky .................. 451/47

* cited by examiner

*Primary Examiner*—M. Rachuba
(74) *Attorney, Agent, or Firm*—Robert L. McDowell

(57) ABSTRACT

Desired crown width and offset can be obtained on the workpiece in a simple manner and with geometrically simple tools, by adjustment of tool lead modification, the axial spacing between tool and workpiece, or the angle of rotation. Tooth flanks modified to be broad-crowned can be produced with virtually any offsets in the one-flank or two-flank process. Theoretically exact results are obtained even after shifting of the tool, and the active tool length required for machining a workpiece may be freely selected over a wide range.

13 Claims, 3 Drawing Sheets

PROCESS FOR WIDENING THE CROWN OF CYLINDRICAL-TYPE GEARS BY CONTINUOUS DIAGONAL HOBBING

FIELD OF THE INVENTION

The invention relates to machining gears and in particular to a process for machining the flanks of gearing which is more or less cylindrical but is modified to widen the crown, in a continuous diagonal hobbing process.

BACKGROUND OF THE INVENTION

Warped flanks occur during generation of helical wide-crowned cylindrical gears in the continuous hobbing process. The offset is a gauge of the warping.

To solve this problem, DE 37 04 607 (corresponding to U.S. Pat. No. 4,850,155 to Sulzer) discloses machining of the gearing in the continuous diagonal hobbing process and in the process using a helical tool whose pressure angle decreases continuously from a maximum value at one end of the worm toward the other end, the maximum pressure angle of the right flank at one end of the worm coinciding with the minimum pressure angle of the left flank and vice versa. Manufacture of this tool is extraordinarily costly.

The Gear Production Practice seminar held at the Technische Akademie Esslinger, Mar. 25 to 27, 1996, also discloses design of the grinding worm so as to be laterally concave, use of this worm in the diagonal process, and derivation of the information necessary for analysis from a special "crowning envelope." This crowning curve is represented over a reference plane which is positioned tangentially to a cylinder concentric with the gear axis; this is presumably a partial cylinder. A crowning envelope such as this is unknown. In other respects as well it appears not to be possible to merge the differently warped crowning envelopes of the two flanks in a common envelope.

The following discussion will also show that use of a concave-crown worm in the diagonal process itself again results in crown concavity. Consequently, proper equalization of the surface or selective production of a desired offset cannot be accomplished exclusively through design of the tool.

It is an object of the present invention to prevent the warping offset or to produce an offset of the flanks which differs from the "natural offset."

SUMMARY OF THE INVENTION

The present invention is based on the technical problem of developing the generic process so that flanks modified to be broad-crowned can be produced with virtually any offsets in the one-flank or two-flank process, so that geometrically simple tools may be used, so that theoretically exact results are obtained even after shifting of the tool, and so that the active tool length required for machining a workpiece may be freely selected over a wide range.

The crown width desired and the offset desired can be obtained at the workpiece in a simple manner and with geometrically simple tools, by adjustment of tool lead modification, the axial spacing between tool and workpiece, or the angle of rotation.

The invention is explained in detail on the basis of embodiments illustrated in the accompanying drawings.

DETAILED DESCRIPTION OF THE PREFERRED EMBODIMENT

On the basis of the following considerations it is explained how offset of the flanks occurs in machining of helical, broad-crowned cylinder gears in the continuous hobbing process, how offset is prevented or reduced to the desired value, and how the tools required for the purpose are designed.

Figure 1:
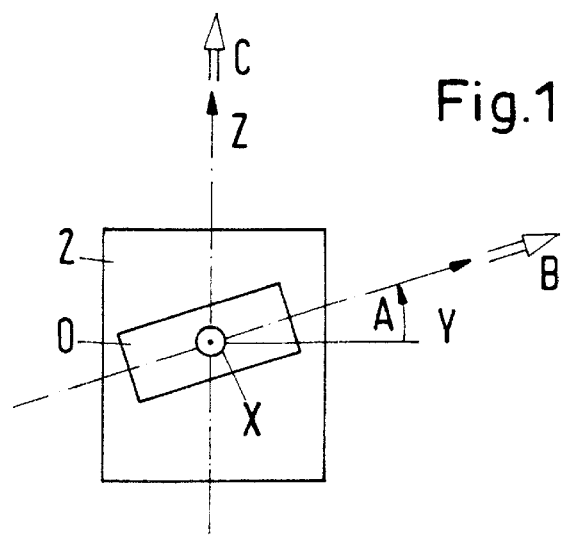
FIG. 1 shows a tool 0, a workpiece 2, and axes for description of positions, distances, and movements.
Figure 2A:
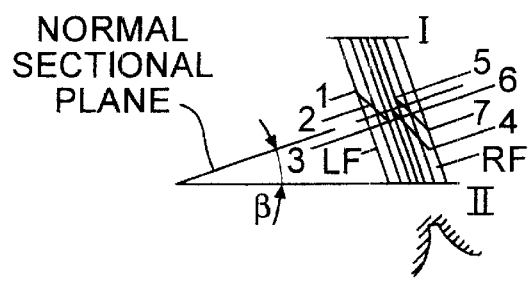
FIGS. 2a and 2b illustrate, respectively, a view of a tooth gap of a helical cylinder gear and a view of an end section engaged with a rack.
Figure 2B:
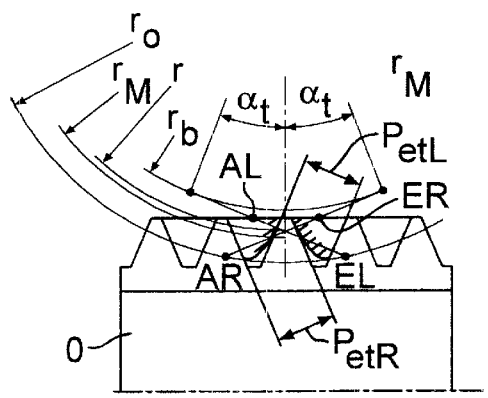

The considerations are based on a machine with vertical workpiece axis of rotation known to be used in hobbing. The axes for description of positions, paths, and movements (FIG. 1) are:

X axial spacing (radial)
Y tool axis direction (tangential)
Z workpiece axis direction (workpiece-axial)
A tool axis swivel
B tool rotation
C workpiece rotation FIG. 2(a) presents a radial view of the tooth space of a helical cylinder gear, and FIG. 2(b) presents the lower part the end section of this gear engaged with a gear rack. Assume that the flanks of this gear are made up more or less of involute helicoids, but that nevertheless wide crowns are present. The symbols used in FIGS. 2(a) and 2(b) have the following meanings:

I Reference frontal surface
II Non-reference frontal surface
$r_a$ Radius on tip cylinder
$r_M$ Radius on measuring cylinder
r radius on partial cylinder
$r_b$ radius on base cylinder
$\alpha_t$ face engagement point
$P_{etL}$ left flank engagement point
$P_{etR}$ right flank engagement point
AL EL transverse contact path of left flank
AR ER transverse contact path of right flank
Line sequence 1–7 connects all points formed during one workpiece rotation in a tooth space during axial feed toward zero. The specifically identified points are situated on the following helical lines:
1 crest form cylinder of left flank
2 measuring cylinder of left flank
3 root form cylinder of left flank
4 space center (the position of point 4 is simultaneously the axial slide position belonging line sequence 1–7)

5 base form cylinder of right flank
6 measuring cylinder of right flank
7 crest form cylinder of right flank Contact is established between tool 0 and workpiece 2 on line sequence 1, 2, 3, 4, 5, 6, 7 so long as tool 0 and workpiece 2 rotate at the required transmission ratio and the root of the workpiece 2 is machined as well. Line sequence 1–3 is required for development of the left flank LF, and the line sequence 5–7 for development of the right flank RF. "Point contact" exists between tool 0 and workpiece 2. "Point contact" means that under ideal conditions only one point on the "generation contact lines" 1–3 or 5–7 exhibits contact between tool and the ideal final workpiece outline in each active hobbing position.

Assume that points 1–7 are rigidly connected to each other. During machining tool 0 and workpiece 2 execute helical movement superimposed on the base rotation. In the process the line sequence 1–7 moves in direction Z, while the workpiece 2 executes corresponding additional rotation C. The curve traces 1, 2, 3 and 5, 6, 7 describe parts of involute helical surfaces in a workpiece coordinate system.

If change occurs in axial spacing $\Delta X$ between tool 0 and workpiece 2 occur during the movement, flanks are obtained which deviate from the nominal involute helical surfaces.

Every change in axial spacing $\Delta X$ leads, e.g., as is known in hobbing of cylindrical involute gearing, to change in the overmeasure (or wear) q by $$q = \Delta X^* \sin \alpha$$

and accordingly to change in the overmeasure $q_t$ in the end section of workpiece 2 by $$q_t = \Delta X^* \sin \alpha_t.$$

In these equations $\alpha$ is the engagement angle and $\alpha_t$ the end engagement angle of the workpiece gearing.

The points of the traces 1, 2, 3 and 5, 6, 7 are at the same level relative to the nominal involute helical surface, that is, each of these points is situated an equal distance from the pertinent point on the nominal involute helical surface.

If a conventional crown width is to be imparted to the gear 2, operation with a cylindrical helical tool results in flanks in which lines on the same level extend diagonally over the flank. During machining in direction +Z point 1 is the first on the crest of the left flank LF to reach plane I. Points 2 and 3 reach plane I at a lower level on the basis of the crown width. What results is profile deviation with projecting workpiece crest. Consequently, there exists an engagement angle deviation $f_{H\alpha} > 0$. If the same considerations are applied to the right flank RF and to both flanks in plane II, we find that in the case at hand (workpiece left diagonal) the crest of the left flank (base of the right flank) projects beyond the base (crest) in plane I, while the relationships are reversed in plane II.

Figure 3:
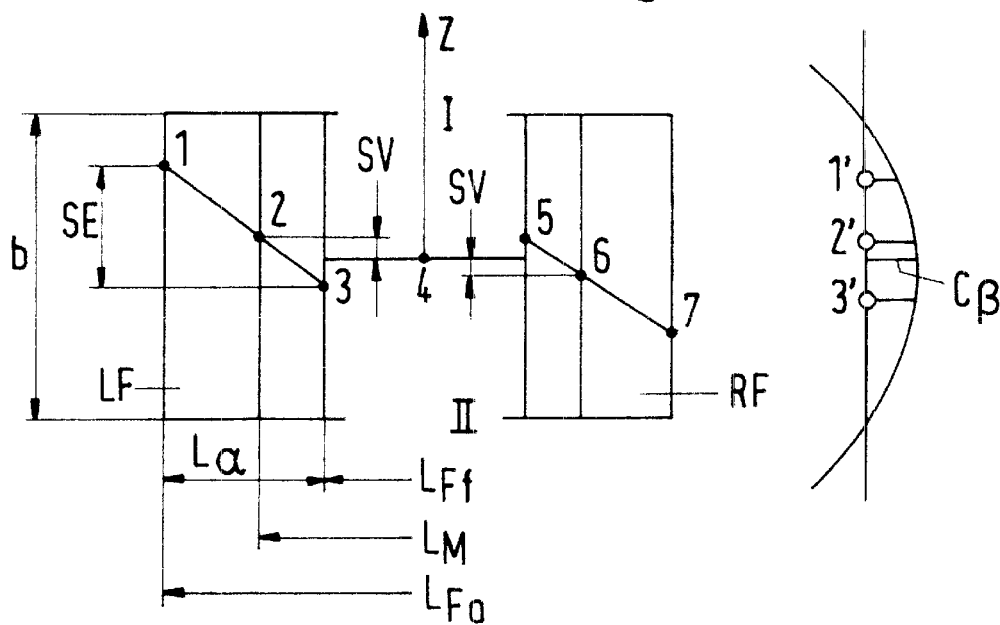
FIG. 3 an illustration for determination of the flank topography in a plane tangential to the base cylinder of the workpiece gearing and the progress of flank line modification in the form of crown width.

While the principle expounded here is clear, for a number of reasons it is ill suited for quantitative considerations. For this reason in the following discussion each of the flanks is shown in a plane tangential to the base cylinder (FIG. 3). The geometrically complex involute helical surfaces become right angles with the edge lengths $L_\alpha$ and b. Any spacing desired may be selected for the flanks. In keeping with the required variation in the flank crown in the righthand portion of the illustration, point 4 may now rise above or fall below the plane of the drawing during movement in direction Z. If points 1–7 are in the process kept rigidly connected to point 4, the traces 1, 2, 3 and 5, 6, 7 then describe the topography of the left and right flanks respectively. A section through the "crowning envelopes" with planes I and II respectively yields four profiles; they may be illustrated as profile diagrams and each of them may be resolved into its components. The total variation contains as components an individual profile angular variation and a crown height which is the same on both flanks in all end sections. The flank line diagrams may also be determined on the measuring cylinder involved. Sections perpendicular to the plane of the drawing through lines extending through 2 or 6 in direction Z are to be determined for this purpose.

As a result of the trace offset SV the high points of the crowns are displaced 2*SV on the left or right flank in the axial direction of the workpiece 2. This results in a flank line angular variation on both flanks. This variation may be calculated and in the case at hand eliminated by way of corresponding increase in the programmed helix angle.

The profile angle variations of a flank in planes I and II may be used to calculate the offset of the profile of these flanks. The following equation applies:

$$S_\alpha = f_{H\alpha I} - f_{H\alpha II}.$$

If it is desired to eliminate the offset, say, of the left flanks of gear 2 in FIG. 2a, a tool 0 is required which generates $f_{H\alpha} = f_{H\alpha II}$ in plane I, $f_{H\alpha} = 0$ in the center of the width of the tooth face, and $f_{H\alpha} = f_{H\alpha I}$ in plane II.

Angular profile variation can be accomplished in the continuous hobbing process with the helical tool (0) by way of the pressure angle and/or the lead.

If we now consider three tools the first of which eliminates the angular profile variations deflections in plane I, the second eliminates none, and the third eliminates the angular profile variations present in plane II by means of adapted leads, we find the following.

The lead on the first tool of the worm flank which machines the left flank right flank) would have to be made smaller (greater) than the rated lead of the worm. The second tool would remain unchanged, while the third one would undergo modification in the direction opposite that of the first tool, that is, an increase in lead greater (smaller) than the rated lead would be required for machining the left flank (right flank).

Figure 4A:
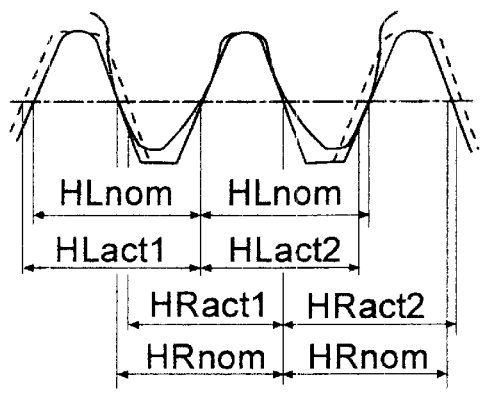
FIGS. 4a and 4b illustrate engagement of a gear tooth with modified-lead helical tools.

If the three (short) worms are now replaced by one long worm whose lead on the left (right) end of the profiled area equals that of the first (third) tool and if the variation in the rated lead is connected by a quadratic parabola, the lead for machining the left flank (right flank) is seen to increase (decrease) to the value required in each instance on the other end of the worm. As is to be seen from FIG. 4a, a tool such as this has a wide crown. The solid lines in this drawing illustrate the unmodified tool, the broken lines the modified tool 0.

Figure 4B:
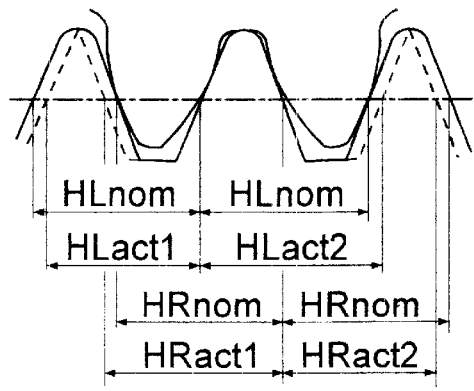

FIG. 4b illustrates a situation in which the teeth to the left or right of the central worm tooth are thinner, so that the worm 0 is accordingly designed to be laterally concave.

Should it not be possible to describe the crown width of the workpiece 2 by a quadratic parabola, the shape of the crown of the tool and the movements must be adapted during machining.

The modified tool may, of course, be used only in the diagonal process. For this purpose the axial slide displacement $\Delta Z$ must be accompanied by execution of tangential slide displacement $\Delta Y$. The diagonal ratio is designated as:

$$D = \Delta Y / \Delta Z.$$

Were the tool customarily employed in the axial process, one whose lead H is not modified, to be replaced by the broad-crowned tool, operation carried out in the diagonal process, and the axial spacing for generation of crown width to be retained, as is customary in the axial process, it would be found among other things that neither the desired crown width nor the desired offset of the flanks results. The cause of this situation is to be found in the fact that the modified tool 0 itself generates a crown width and an offset in the diagonal process. In the example discussed here such crown width is even negative. Moreover, the offset Sα generated by the modified tool 0 is not, as might be expected, the same as $f_{HaI} = f_{HaII}$. Nor does adaptation of movement X(Z) lead to the desired solution.

The solution to the problem is found as follows: crown and offset components are derived from movement X(Z) and movement Y(Z); let the components be designated $C_{\beta X}$, $S_{\alpha X}$ and $C_{62\,Y}$, $C_{\alpha Y}$.

The offset components depend in each instance on the pertinent crown. The following equations accordingly apply:

$$C_\beta = C_{\beta X} + C_{\beta Y} \quad (1)$$

$$S_\alpha = S_{\alpha X} + S_{\alpha Y} \quad (2)$$

$$S_{\alpha X} = f(C_{\beta x}) \quad (3)$$

$$S_{\alpha Y} = f(C_{\beta Y}) \quad (4)$$

If the relationships corresponding to equations (3) and (4) can be demonstrated, the system of equations can be solved.

It is found that in the case of crown widths the progress of which may be described by a quadratic parabola, equations (3) and (4) may be rendered in the following form $$S_{\alpha X} = kx * C_{\beta x} \quad (3a)$$

$$S_{\alpha Y} = ky * C_{\beta y} \quad (4a)$$

With these relationships we find, for example:

$$C_{\beta y} = (S_\alpha - kx * C_{62})/(ky - kx).$$

$C_{\beta x}$ from equation (1), $S_{\alpha X}$ or $S_{\alpha Y}$ from equation (3a) or (4a).

The problem now presents itself of determining kx and ky, or respectively in the general case the relationships derived from equations (3) and (4). There are three ways of doing this, specifically, derivation 1. from machining examples
2. by process simulation, e.g., by coordinate transformation
3. by calculations with conventional formulations.

The same principle underlies each of these methods, even if this possibly is not directly recognized: A modified tool 0 with X(Z) and with Y(Z), the two results are superimposed and are coordinated with each other to yield the two quantities $C_\beta$ and $S_\alpha$.

Two additional comments need to be made concerning proper adaptation of the tool geometry and the paths X(Z) and Y(Z).

In the following discussion X(Z) and the diagonal ratio D are used in place of X(Z) and Y(Z).

The connections between offset and crown are far from being as simple as one might initially assume for the customary application case on the basis of equations (3a) and (4a). That is to say, factor ky is, as the calculations show, a function of D. For the purpose of determining the factors from empirically determined relationships this means the following.

Under ideal conditions (which are never present) kx could be determined rom a single crowned workpiece. But for ky a function of D of the following kind exists:

$$ky = C_1 + C_2/D$$

It would accordingly be essential to machine a whole series of workpieces in the pure diagonal process, and so without X(Z), and evaluate the results by regression calculation based on the above equation.

ky may be calculated by conventional formulations, e.g., as follows. The end section of the workpiece and the rack (FIG. 2) are considered and the corresponding quantities over the normal section are transmitted to the tool axis. The method to be applied for the purpose is demonstrated among others by the exposition in "Pfauter-Wälzfräsen" [Pfauter-Hobbing], Part 1, 1976, Springer-Verlag, Berlin-Heidelberg-New York, pp. 175–346.

The following statements apply initially to the left flanks LF of the workpiece 2. The following is established:

A worm length ΔY over which the worm 0 is to be displaced later, while the axial slide travels ΔZ=b in direction Z.

Which side of the worm is to operate in the vicinity of plane I (let it be the left side in the example under consideration). Diagonal ratio D, including sign, is derived from the two data items.

A component $I_1$ of the rack by the amount of which the latter is to be displaced after conversion on the worm axis while the axial slide travels by the amount of SE.

Figure 5:
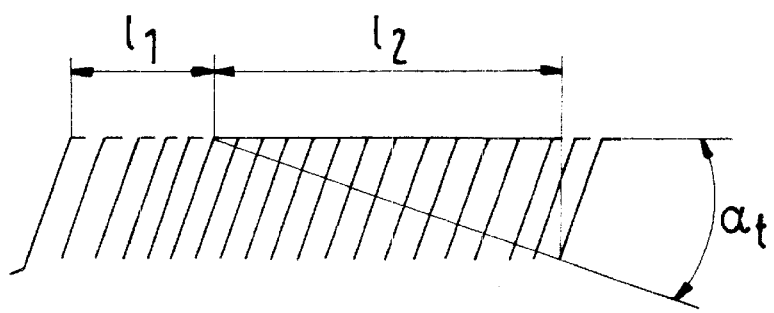
FIG. 5 diagrammatically illustrates a sketch for determination of the worm length required for full development of the profile in the end section of a flank.

The rack would have to be active over the distance $l_1 + l_2$ (FIG. 5). An engagement angle deviation $f_{H\alpha}$ would have to be generated over this distance. The distance $l_1 + l_2$ is to be shortened by $f_{H\alpha}/COS_{\alpha t}$ for this purpose. If this amount of shortening and distance $l_1 + l_2$ are transferred to the tool axis, the lead of the modified worm at a specific point is obtained. If the pressure angle deviation $f_{H\alpha}$ is the modification to be generated in plane I, the lead for the left end of ΔY is applicable. In this position point 2 of the trace 1, 2, 3 in FIG. 3 would have to be situated in plane I. The Z slide is then situated by the amount of SV below plane I.

Let modification of the lead initially be described by a symmetrical second-order parabola over the distance ΔY and the lead on the left end by ΔY.

Figure 6:
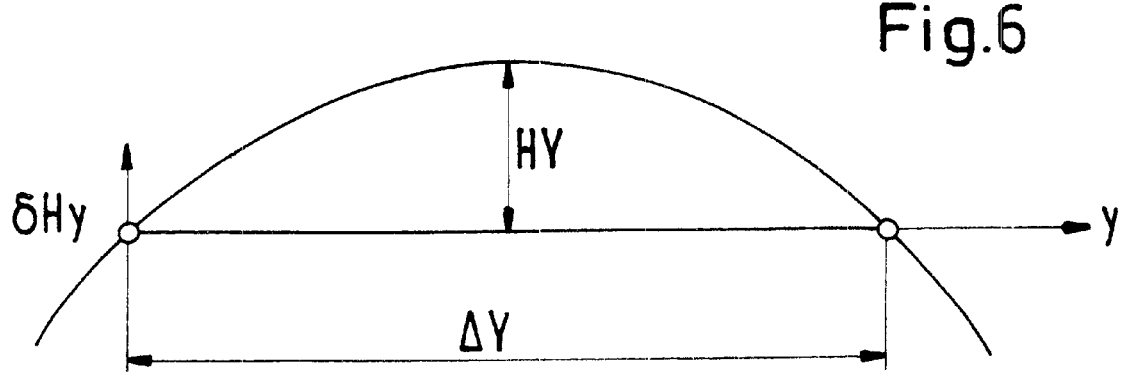
FIG. 6 a diagram illustrating change in the lead $\delta Hy$ as a function of coordinate y of the worm axis.

This parabola can easily be formulated and its height HY above αY calculated (see FIG. 6). $C_{\beta y}$ is obtained from HY by converting HY by way of the normal section to face section of the gear blank 2 and there in the direction tangential to the base circle. The equation (4a) may thus be formed, ky calculated, and the desired coordination performed by means of equations (1) and (2).

The topography of the flank produced in the continuous diagonal hobbing process, with center distance constant, is arrived at in the following manner.

In FIG. 3 the crowning $C_\beta$ is replaced by the crowning component $C_{\beta y}$ and the points 1', 2', 3' are determined in each Z position considered of a trace 1,2,3. The height of the path of $C_{\beta y}$ over all points of the distance 1', 2', 3' is the height over all points of the trace 1, 2, 3.

If the height of all points of the flank or below the plane of the drawing is described by the process, the topography is known. If the envelope-out for the right flank and the results for the two flanks are examined, the following is found.

If the crowning and offset are correct, it may be necessary to make slight corrections in the outline of the worm 0 (constant over the length of the worm); these corrections should eliminate a resulting positive or negative crown height to be expected and any remaining contour angle deviation. If proper allowance has not been made for the trace offset SV, a slightly modified helix angle must be programmed for machining. If proper allowance has not been made for coupling of the Y axis with the Z axis, a slight conicity over X(Z) is to be programmed for machining.

Figure 7:
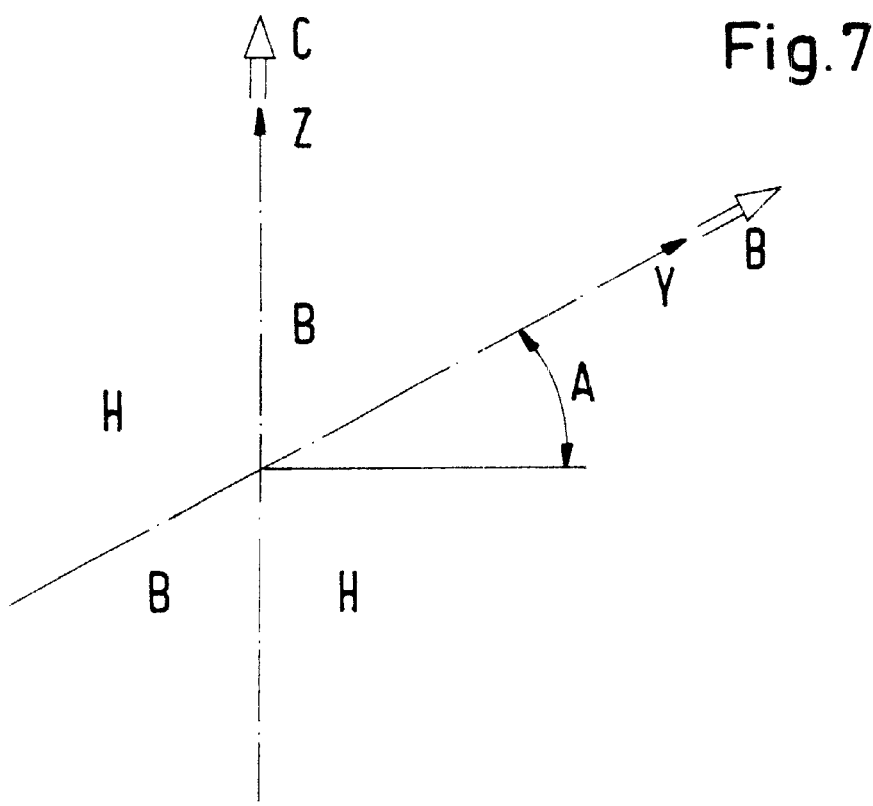
FIG. 7 illustrates axes B, C, Y, and A of FIG. 1 for determination of the type of lead modification required (B broad-crowned, H laterally concave).

The process and the pertinent tool were derived for a left-diagonal gearing for the case in which the left end of the worm operates in the vicinity of plane I. Were the right end of the worm to be operating in the vicinity of plane I, a tool which would have to undergo essentially different modification in accordance with the process described in the foregoing. The tool would be laterally concave and different values would be obtained for constants kx and ky. The direction of the resulting feed movement in directions Y and Z (FIG. 7) would determine whether a tool were to be designed to be laterally concave or laterally convex. If this direction is situated in the area of the angle of intersection of the axes of rotation of tool and gear blank, laterally convex tools B are required, otherwise laterally concave tools H.

The proposed process permits shifting. The shifting may take place after machining of one or more gear blanks 2; it is also possible to rough machine in one area of the tool 0 and to smooth machine in another. For this purpose it is necessary to adjust the center distance over two components. Both components may be derived from the course of $C_{\beta y}$, if the curve is suitably extended. Specifically, this curve may also be interpreted as the course of the overmeasure transversely per flank, as a function of the pertinent Z position on the measuring cylinder. The amount of shift is now converted by way of the diagonal ratio D to the axial direction of the gear blank and this amount is deducted from the central Z position in the correct direction, and (a) the flank overmeasures and (b) the tangent to the "overmeasure" curve are determined in this transverse section. An adjustment amount is obtained for the center distance from (a) which is constant, and from (b) an adjustment amount which varies in proportion to the path of traverse.

With the proposed process and tool it is possible, within certain limits, to produce a crowning and/or offset different from those underlying the design. It is necessary for this purpose to calculate constants kx and ky with equations (1) and (2), and reduce kx by way of the path X(Z) and ky by way of the diagonal ratio to the desired values.

Of course, the process also makes it possible to form both gear blank flanks in separate operations with different lateral convexities and offsets. For this purpose the tool geometry and kinematics are to be established separately for the two flanks.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A process for two-flank machining the flanks of helix crowned cylindrical gearing workpiece in a continuous diagonal hobbing process involving use of a worm tool having a lead that is not constant over the length of the worm, said process comprising:

modifying (a) the lead of the tool, (b) the diagonal ratio of the tool and (c) the spacing of the axes of the tool and the workpiece whereby the modified lead (a), diagonal ratio (b) and the spacing of the axes (c) are coordinated with each other in each instance as a function of the instantaneous operating position in the direction of the axis of the workpiece, whereby a desired helix crowning and a desired offset are obtained on the workpiece.

2. The process of claim 1 wherein the tool comprises an active area and a pair of flanks and wherein the lead (H) of the tool (0) increases linearly from one end of the active area to the other on one flank as the distance increases from one end of the active area of the tool, and decreases linearly on the other flank as the distance increases from one end of the active area of the tool.

3. The process of claim 1 wherein a convex crowned tool (0) is used if the direction of the resulting feed of tool (0) and workpiece (2) is situated within the intersection angle of the axes, and a concave-crowned tool if the direction is situated within an area of 180° minus the intersection angle.

4. The process of claim 1 wherein a tool (0) is used for machining which has been shaped over a lateral area larger than that required for machining a workpiece (2), whose area of operation is shifted, there being superimposed on the movements executed without shifting additional modification of the axial spacing which consists of a constant component and a component proportional to the axial travel.

5. The process of claim 1 wherein the amount of modification and active tool length are coordinated with each other so that the desired helix crowning and offset of the workpiece are generated with no change in the axial spacing.

6. The process of claim 1 in which an extant tool which has been shaped over a sufficiently great width, with which a different helix crowning and/or a different offset is to be generated than taken into account in design of tool and process, wherein the required relationship between the components of helix crowning and offset resulting from the tool modification and the diagonal ratio is brought to the desired value by adaptation of the diagonal ratio.

7. A process for single-flank machining the flanks of helix crowned cylindrical gearing in a continuous diagonal hobbing process involving use of a worm tool having a lead that is not constant over the length of the worm, said process comprising:

modifying (a) the lead of the tool, (b) the diagonal ratio of the tool and (c) the spacing of the axes of the tool and the workpiece or the angle of rotation of the workpiece whereby the modified lead (a), diagonal ratio (b) and the spacing of the axes or the angle of rotation of the workpiece (c) are coordinated with each other in each instance as a function of the instantaneous operating position in the direction of the axis of the workpiece, whereby a desired helix crowning and a desired offset are obtained on the workpiece.

8. The process of claim 7 wherein the tool comprises an active area and a pair of flanks and wherein the lead (H) of the tool (0) increases linearly from one end of the active area to the other on one flank as the distance increases from one end of the active area of the tool, and decreases linearly on the other flank as the distance increases from one en d of the active area of the tool.

9. The process of claim 7 wherein a convex crowned tool (0) is used if the direction of the resulting feed of tool (0) and workpiece (2) is situated within the intersection angle of the axes, and a concave-crowned tool if the direction is situated within an area of 180° minus the intersection angle.

10. The process of claim 7 wherein a tool (0) is used for machining which has been shaped over a lateral area larger than that required for machining a workpiece (2), whose area of operation is shifted, there being superimposed on the movements executed without shifting additional modification of the axial spacing which consists of a constant component and a component proportional to the axial travel.

11. The process of claim 7 wherein the amount of modification and active tool length are coordinated with each other so that the desired helix crowning and offset of the workpiece are generated with no change in the axial spacing.

12. The process of claim 7 in which an extant tool which has been shaped over a sufficiently great width, with which a different helix crowning and/or a different offset is to be generated than taken into account in design of tool and process, wherein the required relationship between the components of helix crowning and offset resulting from the tool modification and the diagonal ratio is brought to the desired value by adaptation of the diagonal ratio.

13. The process as of claim 7 wherein the two flanks (RF, LF) are machined separately whereby different helix crowning and/or offsets are imparted to them.

* * * * *